(12) United States Patent
Shupe

(10) Patent No.: US 9,596,796 B2
(45) Date of Patent: Mar. 21, 2017

(54) DEVICES FOR REMOVING VEGETATION FROM GROUND SURFACES

(71) Applicant: Thomas Shupe, St. Louis, MO (US)

(72) Inventor: Thomas Shupe, St. Louis, MO (US)

( * ) Notice: Subject to any disclaimer, the term of this patent is extended or adjusted under 35 U.S.C. 154(b) by 0 days.

(21) Appl. No.: 14/631,435

(22) Filed: Feb. 25, 2015

(65) Prior Publication Data

US 2015/0237789 A1   Aug. 27, 2015

Related U.S. Application Data

(60) Provisional application No. 61/945,002, filed on Feb. 26, 2014.

(51) Int. Cl.
*A01B 1/16* (2006.01)
*A01D 7/10* (2006.01)

(52) U.S. Cl.
CPC . *A01B 1/16* (2013.01); *A01D 7/10* (2013.01)

(58) Field of Classification Search
CPC .... A01B 1/14; A01B 1/24; A01B 1/22; A01B 1/222; A01B 1/16; A01D 7/00; A01D 7/10; A01D 7/12; A01G 1/12
USPC ............... 172/371–378; 56/400.01–400.19; 294/19.1, 50.5–50.7, 55.5, 61
See application file for complete search history.

(56) References Cited

U.S. PATENT DOCUMENTS

| | | | | |
|---|---|---|---|---|
| 148,660 | A * | 3/1874 | Brown | A01D 7/10 56/400.08 |
| 320,597 | A * | 6/1885 | Stabler | A01D 7/10 56/400.08 |
| 722,028 | A * | 3/1903 | Lubin | A01B 3/68 172/23 |
| 905,808 | A * | 12/1908 | Fruecht et al. | A01D 7/10 56/400.08 |
| 1,112,787 | A * | 10/1914 | Glover | A01D 7/10 56/400.08 |
| 2,669,086 | A * | 2/1954 | Kairis | A01D 7/10 56/400.08 |
| 2,748,557 | A * | 6/1956 | Eadie | A01G 1/12 15/188 |
| 3,538,533 | A * | 11/1970 | Woods | A47L 11/32 15/142 |
| 3,913,169 | A * | 10/1975 | Seymour | A47L 9/02 15/142 |
| 4,059,945 | A * | 11/1977 | Martinez | A01D 7/10 56/400.1 |
| 5,161,360 | A * | 11/1992 | Hill | A01D 7/06 56/400.17 |

(Continued)

*Primary Examiner* — Robert Pezzuto
(74) *Attorney, Agent, or Firm* — Harness, Dickey & Pierce, P.L.C.

(57) ABSTRACT

A device is provided for removing vegetation from ground surfaces. The device generally includes a base, multiple tines extending from the base, and a handle coupled to base for moving the base relative to a ground surface for removing vegetation from the ground surface. The tines are arranged on the base in an array comprising at least two rows, where at least one of the at least two rows is offset from at least another one of the at least two rows. In addition, each of the tines has a shaft and a generally rounded head. As such, the tines allow the device to remove the vegetation when operated in a plurality of directions and to improve grasping of the vegetation such that the vegetation may be removed from the ground surface with roots included.

20 Claims, 12 Drawing Sheets

(56) References Cited

U.S. PATENT DOCUMENTS

| | | | | |
|---|---|---|---|---|
| 5,802,657 | A | * | 9/1998 | Nogues .................. A46B 17/06 15/142 |
| 6,442,921 | B2 | * | 9/2002 | Feeley .................... E02F 3/962 37/405 |
| 6,634,163 | B2 | * | 10/2003 | Kill ........................ A01D 51/00 56/400.03 |
| 7,784,257 | B2 | * | 8/2010 | Williams .................. E01H 1/12 172/378 |
| D703,499 | S | * | 4/2014 | Jochim ........................... D8/13 |

* cited by examiner

DEVICES FOR REMOVING VEGETATION FROM GROUND SURFACES

CROSS-REFERENCE TO RELATED APPLICATION

This application claims the benefit of and priority to U.S. Provisional Application No. 61/945,002 filed on Feb. 26, 2014. The entire disclosure of the above application is incorporated herein by reference.

FIELD

The present disclosure generally relates to devices for removing and/or collecting vegetation from ground surfaces such as yards, fields, etc.

BACKGROUND

This section provides background information related to the present disclosure which is not necessarily prior art.

Rakes and other lawn tools have previously been developed to assist in collecting and/or removing debris from yards.

DRAWINGS

The drawings described herein are for illustrative purposes only of selected embodiments and not all possible implementations, and are not intended to limit the scope of the present disclosure.

Figure 21:
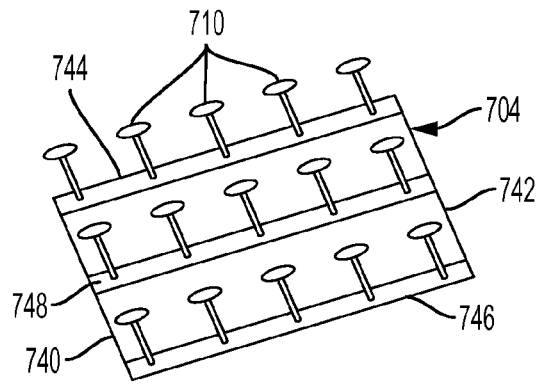
Figure 22:
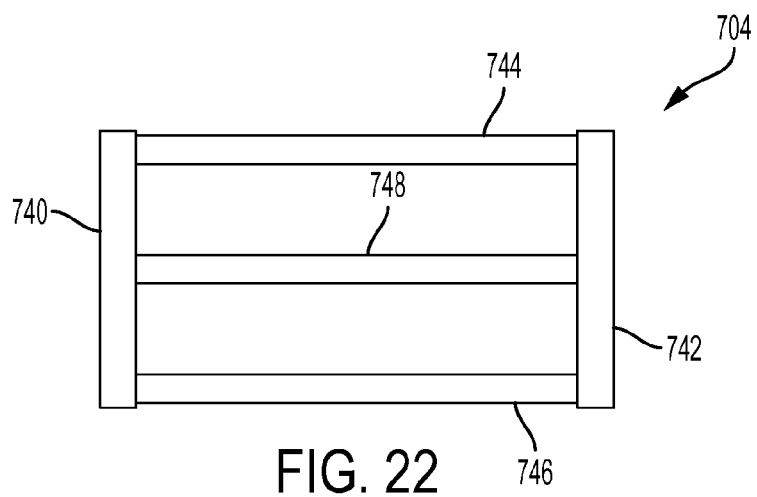

FIG. 21 a perspective view of an exemplary base that can be used in devices of the present disclosure for removing vegetation from ground surfaces;

FIG. 22 is a bottom view of the base of FIG. 21; and

Figure 23:
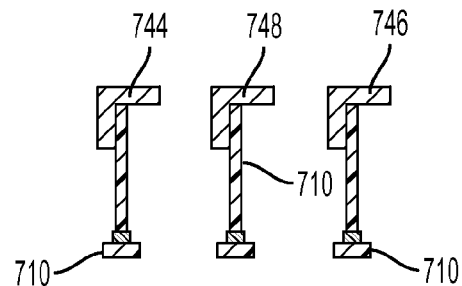

FIG. 23 is a sectional view of the base of FIG. 22, illustrating tines coupled to cross supports of the base.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

The inventor hereof has developed, and discloses herein, exemplary embodiments of devices for removing vegetation from ground surfaces. The ground surfaces may include, but are not limited to, yards, lawns, fields, etc. The vegetation to be removed may include, but is not limited to, undesired vegetation, lawn weeds, weeds and/or vegetation that have vine based root systems (e.g., creeping runners, etc.), etc. In some aspects, the devices of the present disclosure may substantially simultaneously collect and remove several types of vegetation from the ground surfaces.

In some exemplary embodiments, the devices of the present disclosure may have projecting structures (e.g., tines, etc.) arranged to engage, grasp, collect, remove, etc. vegetation as the devices are moved over the ground surfaces. In these embodiments, the projecting structures operate to engage and remove the vegetation from the ground surface. In some aspects, the devices remove the vegetation from the ground surfaces with roots included, thereby inhibiting further growth, spreading, etc. of the vegetation. In some further aspects, the removed vegetation may be collected on the devices by the projecting structures (e.g., between tines of the projecting structures, etc.) for subsequent processing (e.g., disposal, etc.).

In some exemplary embodiments, the projecting structures of the devices may also (or alternatively) be configured (e.g., sized, shaped, arranged, etc.) to allow users to move the devices in a range of desired directions across the ground surfaces to engage and remove vegetation. In some aspects, the projecting structures of the devices may be configured to allow the users to move the devices in a full 360 degree range of sweeping motion across the ground surfaces. For example, in some embodiments of the present disclosure, the projecting structures of the devices may include tines with generally flattened and/or circular heads that allow users to move the devices in the full 360 degree range of sweeping motion across the ground surfaces.

In some exemplary embodiments, the devices of the present disclosure may also include handles that can be grasped by the users to move the projecting structures of the devices across the ground surfaces, for engaging and removing vegetation. In some aspects, the handles may be oriented (e.g., relative to the projecting structures, relative to the ground surfaces, etc.) at a generally low angle so that the devices can be pulled across the ground surfaces as well as pushed forward and slid side-to-side across the ground surfaces (e.g., in a full 360 degree range of sweeping motion across the ground surfaces, etc.).

In some exemplary embodiments, the devices of the present disclosure may also (or alternatively) include structures arranged to remove vegetation from the devices, for example, from the projecting structures, etc. In some aspects, the structures are moveable relative to the projecting structures. As such, users can engage the structures and pry, push, pull, dislodge, etc. the vegetation from the projecting structures as desired (e.g., for disposal, etc.).

In some exemplary embodiments, the devices of the present disclosure may be configured (e.g., sized, shaped, constructed, etc.) for manual use. In other exemplary embodiments, the devices of the present disclosure may be configured (e.g., sized, shaped, constructed, etc.) for use in connection with a vehicle (e.g., to be pulled by a vehicle, to be coupled to a vehicle and moved about by the vehicle, etc.). In such other exemplary embodiments, the devices may be larger in size and heavier than corresponding devices configured for use by individuals.

With reference now to the drawings, FIGS. 1-6 illustrate an exemplary embodiment of a device 100 (e.g., a weed ripper, a weed remover, a vegetation remover, etc.) for removing vegetation from ground surfaces and including one or more aspects of the present disclosure. The ground surfaces may include, but are not limited to, yards, lawns, fields, etc. The vegetation to be removed may include, but is not limited to, undesired vegetation, lawn weeds, weeds and/or vegetation that have vine based root systems (e.g., creeping runners, etc.), etc.

Figure 1:
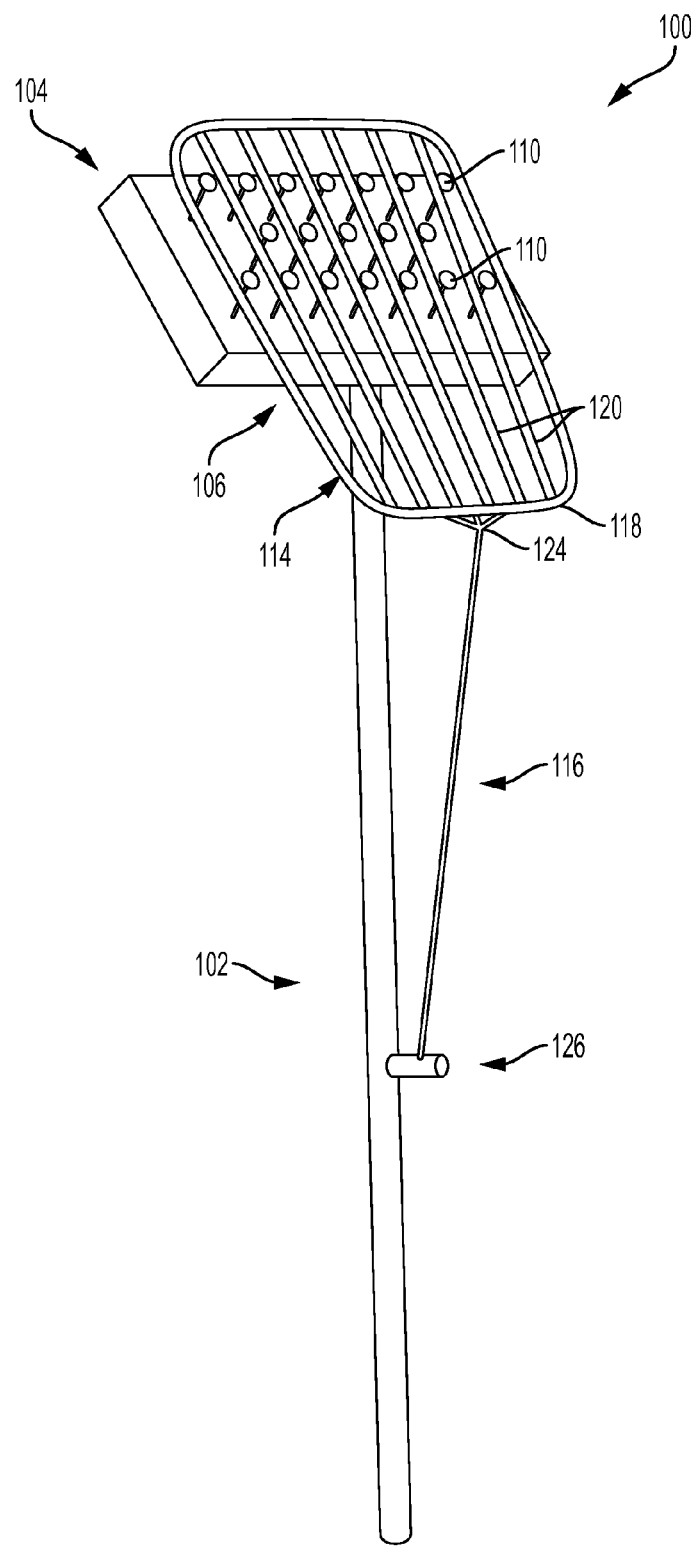
FIG. 1 is a perspective view of an exemplary embodiment of a device according to the present disclosure for removing vegetation from ground surfaces.

As shown in FIG. 1, the illustrated device 100 generally includes a handle 102, a base 104 (e.g., a head, a block, etc.), and an extraction unit 106 (e.g., a flipper, etc.). The handle 102 is coupled to the base 104, and can be grasped by a user to move the device 100 across the ground surface to engage and remove vegetation from the ground surface as desired. The extraction unit 106 is pivotally coupled to the base 104, and can be selectively operated by the user to remove collected vegetation from the base 104 (e.g., vegetation removed from the ground surface and collected on the base 104, etc.). In other exemplary embodiments, devices for removing vegetation from ground surfaces may not include extraction units.

In the illustrated device 100, the handle 102 is coupled to the base 104 by threading the handle 102 into the base 104. The handle 102 can have any suitable shape and/or length and/or circumference within the scope of the present disclosure. For example, and without limitation, the handle 102 may have a length of about sixty inches, and a rounded circumference of about 3.5 inches. Similarly, the base 104 of the device 100 can have any suitable shape and or size that allows for operating/using the device 100. For example, and without limitation, the base 104 may have a generally rectangular shape with a length ranging from about one foot to about two feet, and a width ranging from about three inches to about six inches. Although example shapes and dimensions for the handle 102 and the base 104 of the device 100 have been disclosed herein, it is understood that any suitable shapes and/or dimensions for the handle 102 and/or base 104 of the device 100 may be used without departing from the scope of the present disclosure. In addition, the handle 102 could be coupled to the base 104 differently than disclosed herein. For example, the handle 102 could be threaded into mounts on the base 104 (as opposed to being threaded directly into the base 104), coupled to the base 104 by fasteners, supported by different shapes/configurations of braces, etc.

The handle 102 of the device 100 is also coupled to the base 104 at an angle relative to the base 104 (and relative to a ground surface when the device 100 is in use, etc.). In the illustrated embodiment, the handle 102 is coupled to the base 104 at a generally low angle (e.g., an angle of about forty degrees relative to a plane generally including the base 104 of the device 100, etc.). This brings the handle 102 generally closer to the ground surface during use of the device 100 (e.g., when the base 104 is generally flat against the ground surface, etc.), and allows (e.g., makes it possible for, makes it easier for, etc.) the user to pull the device 100 across the ground surface as well as push the device 100 forward and/or move the device 100 side-to-side (e.g., in a full 360 degree range of sweeping motion across the ground surface, etc.). With that said, it should be appreciated that the handle 102 can be coupled to the base 104 at any desired angle within the scope of the present disclosure including, for example, about forty degrees, greater than about forty degrees, less than about forty degrees, etc. It should also be appreciated that the desired angle of the handle 102 may depend on heights of users, etc. What's more, generally steeper angles of the handle 102 may be used, but may allow the user to only pull the device 100 across the ground surface.

Figure 2:
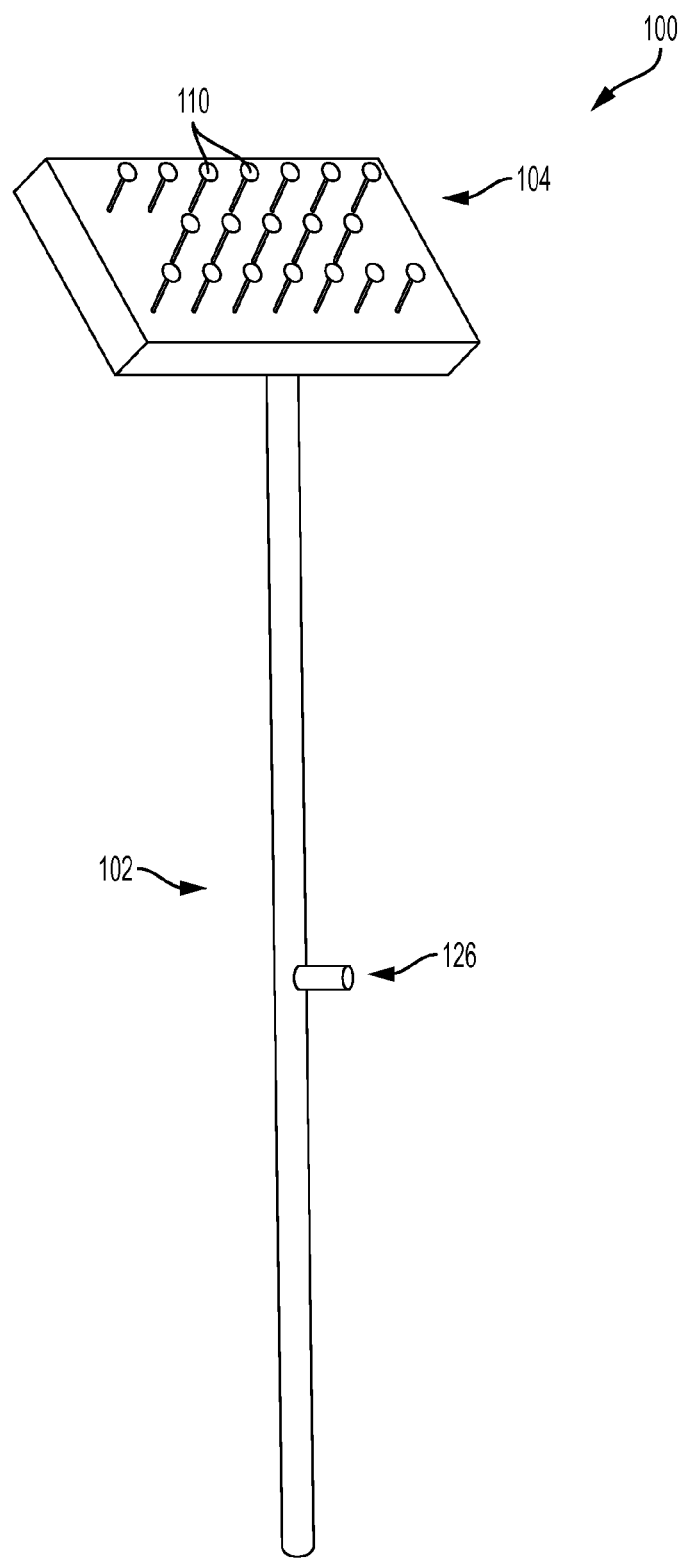
FIG. 2 is the perspective view of FIG. 1, with an extraction unit of the device removed.

With additional reference to FIG. 2, the base 104 of the device 100 includes multiple tines 110 (e.g., spikes, etc.) projecting from the base 104 and configured to engage the ground surface, and the vegetation, in use of the device 100. The tines 110 can be coupled to the base 104 by suitable means. For example, in the illustrated embodiment, the tines 110 are threaded into the base 104. In other exemplary embodiments, devices may include bases with tines welded thereto, glued thereto, bolted thereto, formed integral therewith, etc.

In the illustrated embodiment, the tines 110 of the base 104 are arranged in an array having three rows, with each of the tines 110 generally uniformly spaced apart (e.g., about one inch, about two inches, greater than about two inches, between about one and about four inches, other lengths, etc.). A first row (e.g., a row located toward a forward edge of the base 104, etc.) and a third row (e.g., a row located toward a rearward edge of the base 104, etc.) of the tines 110 are arranged generally in line with each other (e.g., the tines 110 of the first row and the tines 110 of the third row are generally vertically aligned, etc.). And, a second row (e.g., a middle row, etc.) of the tines 110 is located generally between the first and third rows. In the second row, the tines 110 are staggered with respect to the placement of the tines 110 in the first and third rows (and generally aligned with a center of the spaces between adjacent tines 110 in the first and third rows). As an example, if the tines 110 in the first and third rows are located at zero inches, two inches, four inches, and six inches, the tines 110 in the second row are then located at one inch, three inches, and five inches. This offset arrangement of tines 110 may help facilitate grasping, holding, collecting, etc. of the vegetation so that the vegetation can be removed from the ground surface with roots included.

With that said, it should be understood that any suitable arrangement of the tines 110 may be used in the device 100 without departing from the scope of the present disclosure. For example, the tines 110 may be arranged on the base 104 in arrays having a number of rows other than three (e.g., depending on the size of the base 104, manageability of the device 100, weight of the device 100, etc.) and/or rows having a number of tines 110 different than disclosed herein (e.g., depending on the size of the base 104, manageability of the device 100, weight of the device 100, etc.), and/or the tines 110 may be arranged with at least some of the tines 110 not uniformly spaced apart from adjacent tines 110, etc. Further, in some embodiments, tines may even be provided in arrangements other than arrays.

Each of the tines 110 includes a shaft and a generally rounded (e.g., generally circular, generally arcuate, generally oval, etc.) head. In some aspects, the head may also be generally flat (e.g., a portion of the head configured to engage the ground surface may be generally flat, etc.). In the illustrated embodiment, the head is generally circular in shape, and the head of each of the tines 110 has a circumference that is generally greater than a circumference of the shaft. Each of the tines 110 is also coupled to the base 104 by the shaft, with the head then positioned, spaced, etc. a distance from the base 104 (e.g., about two inches, greater than about two inches, less than about two inches, any desired distance, etc.). The generally flat heads of the tines 110 help the tines 110 slip under the vegetation (e.g., under roots of vegetation, under portions of vine based vegetation, under roots of vine based vegetation, under a weed's creeping runners, etc.), and may help facilitate grasping of the vegetation so that the vegetation can be removed from the ground surface with roots included. The generally circular shapes of the tines 110 help allow the user to move the device 100 in a full 360 degree range of sweeping motion across the ground surface during use. Further, the spacing of the heads of the tines 110 from the base 104 helps accommodate the removal of the vegetation from the ground surface and, in some aspects, collection of the vegetation on the base 104. With that said, it should be appreciated that any suitable configuration of tines may be used with the device 100, for example, tines with differently shaped heads and/or differently shaped shafts, and/or tines with different types of heads and/or shafts, etc.

With additional reference now to FIGS. 3-6, the extraction unit 106 of the device 100 generally includes a grate 114, and an actuator 116 coupled to the grate 114. The grate 114 is coupled to the base 104 and is selectively moveable (e.g., pivotable, etc.) by the actuator 116, relative to the base 104, to remove vegetation from the device 100 as needed/desired. For example, the grate 114 can be positioned generally flat against the base 104 in a first, closed position (FIG. 3) during use of the device 100 to allow the tines 110 of the head to engage and remove vegetation from the ground surface. The grate 114 can then be moved, relative to the base 104, to a second, open position (FIG. 4) to remove collected vegetation from the device 100 (e.g., the grate 114 can be moved, advance, etc. past the heads of the tines 110 to thereby remove, dislodge, etc. vegetation from the device 100, etc.). Thus, as can be seen, the grate 114 can be positioned out of the way of the tines 110 during use of the device 100 so that the tines 110 can engage and remove the vegetation from the ground surface, but can then also be moved to a position for removing, dislodging, etc. collected vegetation from the base 104.

Figure 5:
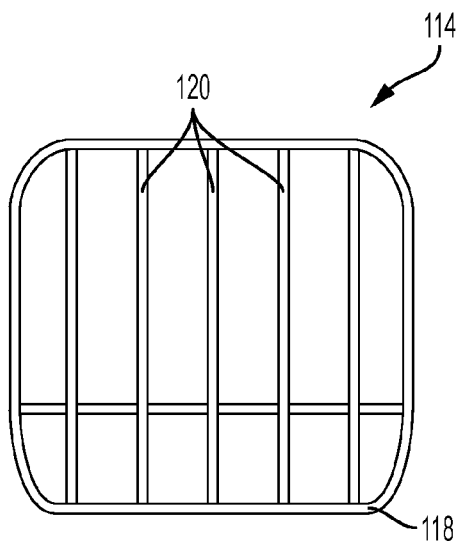
FIG. 5 is a top view of a grate of the extraction unit of the device of FIG. 1.
Figure 6:
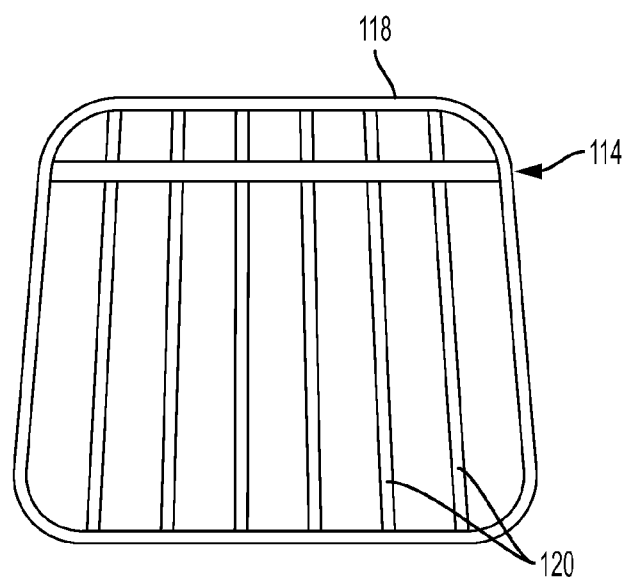
FIG. 6 is a bottom perspective view of the grate of the extraction unit of the device of FIG. 1.

As shown in FIGS. 5 and 6, the illustrated grate 114 generally includes a frame 118 and multiple longitudinal members 120 positioned generally within the frame 118 and coupled thereto (e.g., welded, etc.). The longitudinal members 120 are spaced apart so that, when the grate 114 is in the first position, generally flat against the base 104, the longitudinal members 120 are disposed generally between the tines 110 (with the heads of the tines 110 extending generally beyond the longitudinal members 120). The grate 114 can then move from the first position to the second position, relative to the tines 110, without interference (e.g., such that the longitudinal members 120 can move beyond the tines 110, and remove vegetation collected by the tines 110 generally above the grate 114, etc.). In addition, the longitudinal members 120 are sized so that, when the grate 114 is in the first position, the spacing between the base 104 and the heads of the tines 110 is generally maintained to thereby allow use of the device 100 to remove vegetation from the ground surface. Further, the frame 118 may be shaped to help avoid interference with the ground surface during use of the device 100. For example, forward and/or rearward portions of the frame 118 may extend generally beyond the base 104 and may be bent, folded, etc. generally upwardly, etc.

Figure 3:
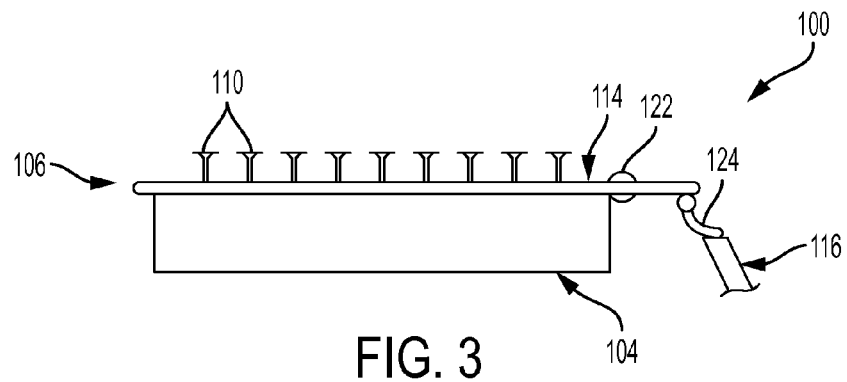
FIG. 3 is a side view of the extraction unit and a base of the device of FIG. 1, with an actuator of the extraction unit removed, and with the extraction unit in a generally closed position.
Figure 4:
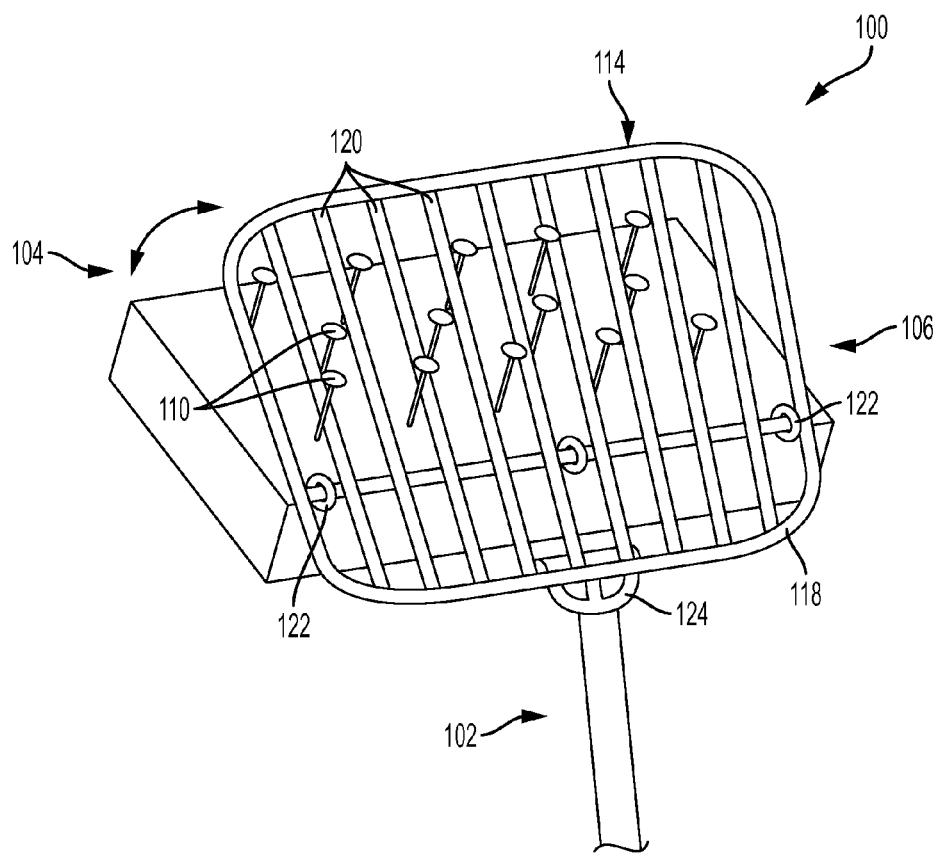
FIG. 4 is a perspective view of the extraction unit of the device of FIG. 1 shown coupled to the base of the device, with the extraction unit in a generally open position.

In the illustrated embodiment, the grate 114 of the extraction unit 106 is pivotally coupled to a rearward end portion of the base 104 by hinges 122 (FIGS. 3 and 4). As such, the grate 114 can pivot (via the hinges 122) between the first position where the grate 114 is substantially flat against the base 104, and the second position where the grate 114 is at an angle relative to the base 104. In some aspects, the hinges 122 may also include a spring mechanism that biases the grate 114 toward the first position where the grate 114 is generally flat against the base 104. Alternatively, suitable fasteners may be used to help hold the grate 114 in the first position during use of the device 100 (where the fasteners can be disengaged when desired to move the grate 114 to the second position).

Also in the illustrated embodiment, the actuator 116 is pivotally coupled to the grate 114 by a hinge 124 to thereby allow the actuator 116 to move the grate 114 between the first and second positions. In some aspects, the grate 114 may extend beyond a rear end portion of the base 104 of the device 100 and may even further have a bend to allow for a smaller angle of coupling between the actuator 116 and the grate 114. A free end of the actuator 116 is configured to releasably couple to the handle 102 at a structure 126 (e.g., at a detent on the handle 102, at a handle tube, at a stop on the handle 102, etc.), for example, to hold the actuator 116 stationary until use of the extraction unit 106 is needed, to help hold the grate 114 generally flat against the base 104 (in the first position), to help inhibit interference from the actuator 116 during use of the device 100, etc. When desired, the free end of the actuator 116 may then be pulled away from the handle 102 to allow the user to operate the extraction unit 106 and move the grate 114 (e.g., pivot the grate 114 past the tines 110 to remove vegetation from the tines 110 and/or base 104 of the device 100, etc.). Although the extraction unit 106 of the illustrated device 100 has been described as having an actuator 116 for use in moving the grate 114, it should be appreciated that the actuator 116 could be removed from the extraction unit 106 and the grate 114 could be manually operated.

FIGS. 7-12B illustrate another exemplary embodiment of a device 200 (e.g., a weed ripper, a weed remover, a vegetation remover, etc.) for removing vegetation from ground surfaces and including one or more aspects of the present disclosure. Again, the ground surfaces may include, but are not limited to, yards, lawns, fields, etc. And, the vegetation to be removed may include, but is not limited to, undesired vegetation, lawn weeds, weeds and/or vegetation that have vine based root systems (e.g., creeping runners, etc.), etc.

Figure 7:
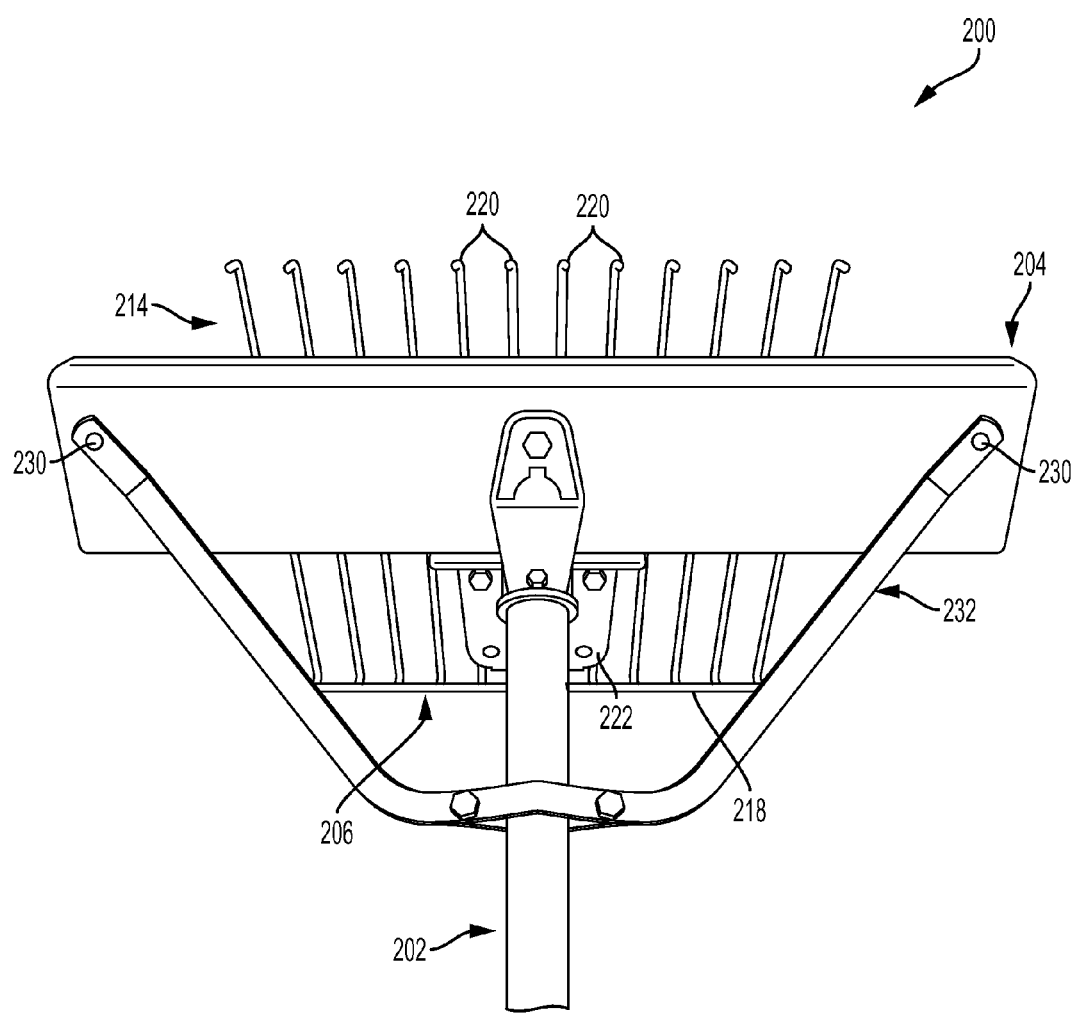
FIG. 7 is a fragmentary perspective view of another exemplary embodiment of a device according to the present disclosure for removing vegetation from ground surfaces.
Figure 8:
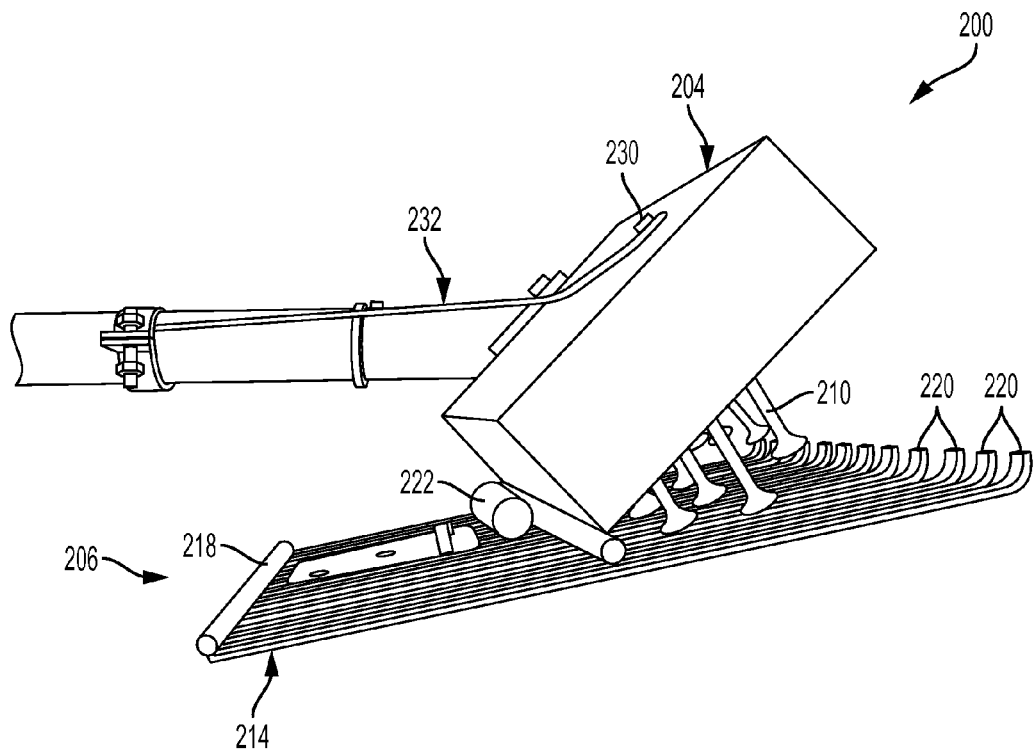
FIG. 8 is another fragmentary perspective view of the device of FIG. 7.

As shown in FIGS. 7 and 8, the illustrated device 200 generally includes a handle 202, a base 204 (e.g., a head, a block, etc.), and an extraction unit 206 (e.g., a flipper, etc.). The handle 202 is coupled to the base 204, and can be grasped by a user to move the device 200 across the ground surface to engage and remove vegetation from the ground surface as desired. The extraction unit 206 is pivotally coupled to the base 204, and can be selectively operated by the user to remove collected vegetation from the base 204 (e.g., vegetation removed from the ground surface and collected on the base 204, etc.). In the illustrated device 200, the handle 202 is coupled to the base 204 by fasteners 230 and supported by a brace 232 (e.g., to provide support to a full range of movement of the device 200 across the ground surface, etc.). With that said, it should be appreciated that any suitable fasteners and/or braces may be used, for example, configured as shown in the drawings or configured differently than illustrated.

The handle 202 of the device 200 is also coupled to the base 204 at an angle relative to the base 204 (and relative to a ground surface when the device 200 is in use, etc.). In the illustrated embodiment, the handle 202 is coupled to the base 204 at a generally low angle (e.g., an angle of about forty degrees relative to a plane generally including the base 204 of the device 200, etc.). This brings the handle 202 generally closer to the ground surface during use of the device 200 (e.g., when the base 204 is generally flat against the ground surface, etc.), and allows (e.g., makes it possible for, makes it easier for, etc.) the user to pull the device 200 across the ground surface as well as push the device 200 forward and/or move the device 200 side-to-side (e.g., in a full 360 degree range of sweeping motion across the ground surface, etc.). With that said, it should be appreciated that the handle 202 can be coupled to the base 204 at any desired angle within the scope of the present disclosure including, for example, about forty degrees, greater than about forty degrees, less than about forty degrees, etc.

Figure 9:
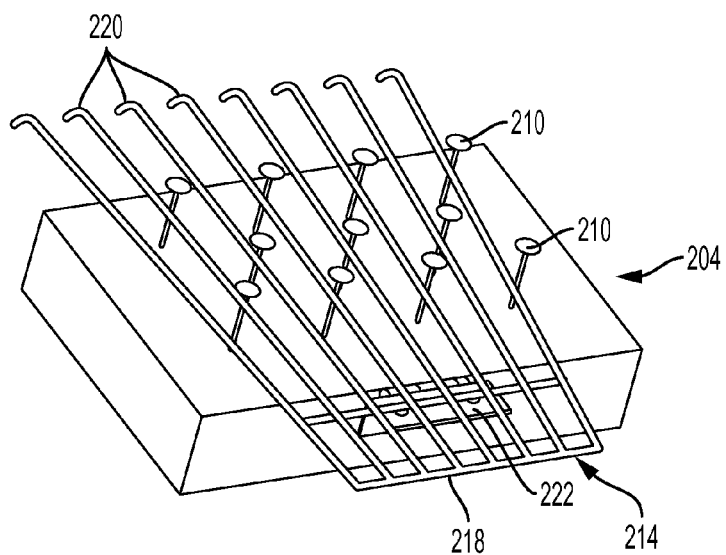
FIG. 9 is a perspective view of the device of FIG. 7, with an actuator of an extraction unit of the device removed, and illustrating a hinge coupling between a grate of the extraction unit and a base of the device.
Figure 10:
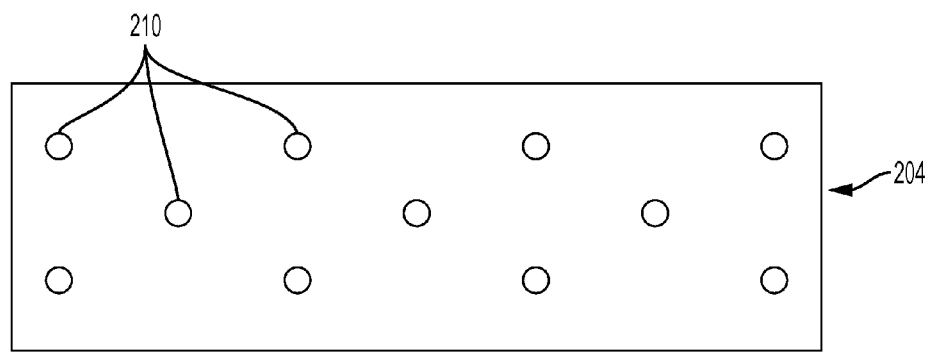
FIG. 10 is a top view of the base of the device of FIG. 7, illustrating arrangement of tines of the device.
Figure 11A:
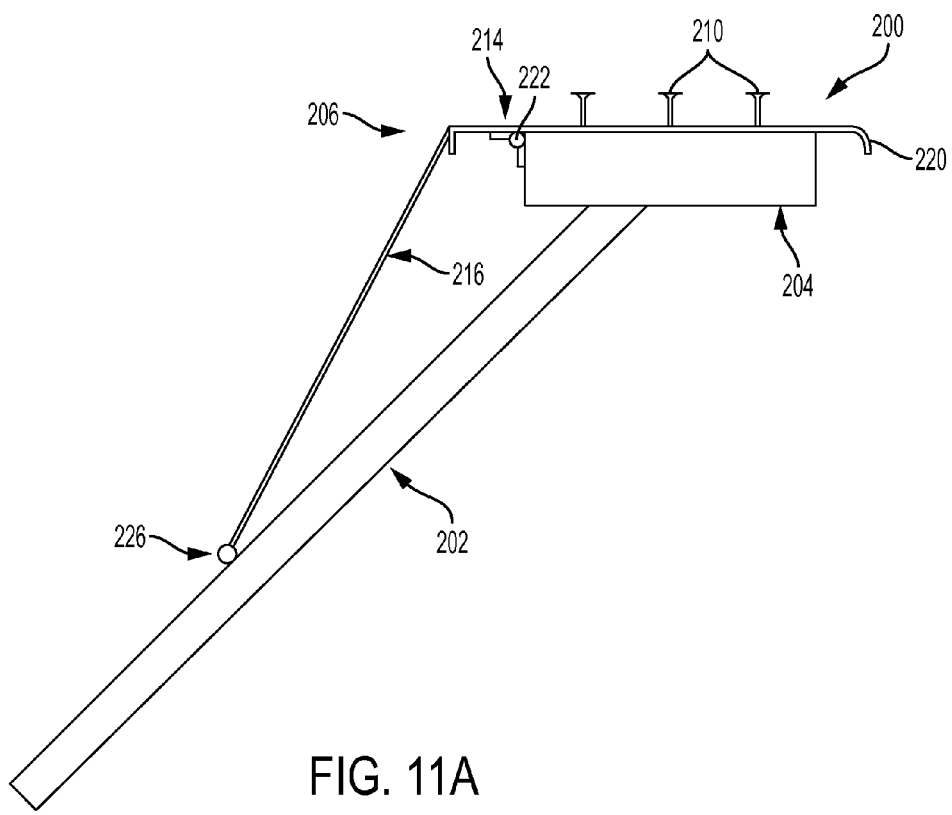
FIG. 11A is a side view of the device of FIG. 7, with a brace of the device removed and with the extraction unit in a generally closed position.
Figure 11B:
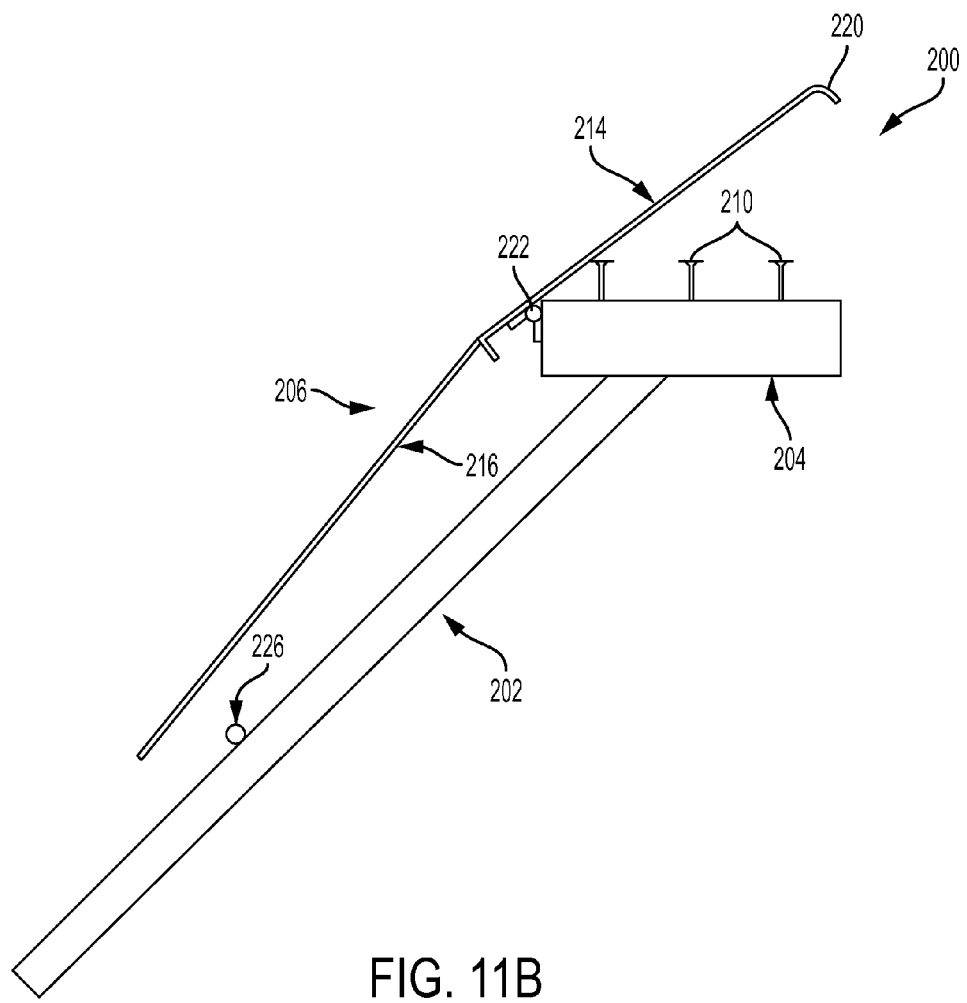
FIG. 11B is the side view of FIG. 11A, with the extraction unit in a generally open position.
Figure 12A:
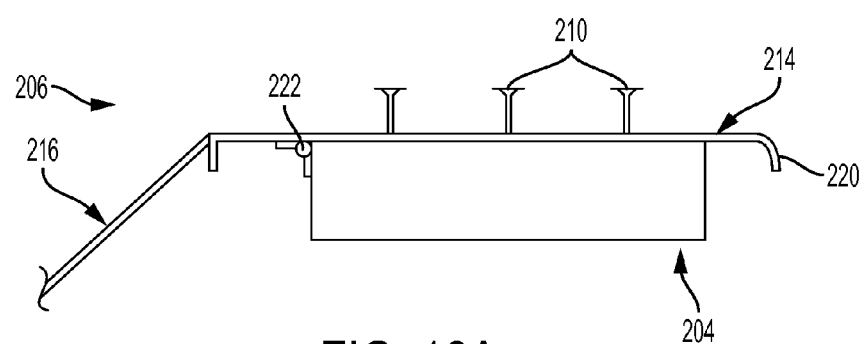
FIG. 12A is a fragmentary side view of the device of FIG. 7, with a handle of the device and the brace of the device removed and with the extraction unit in a generally closed position.
Figure 12B:
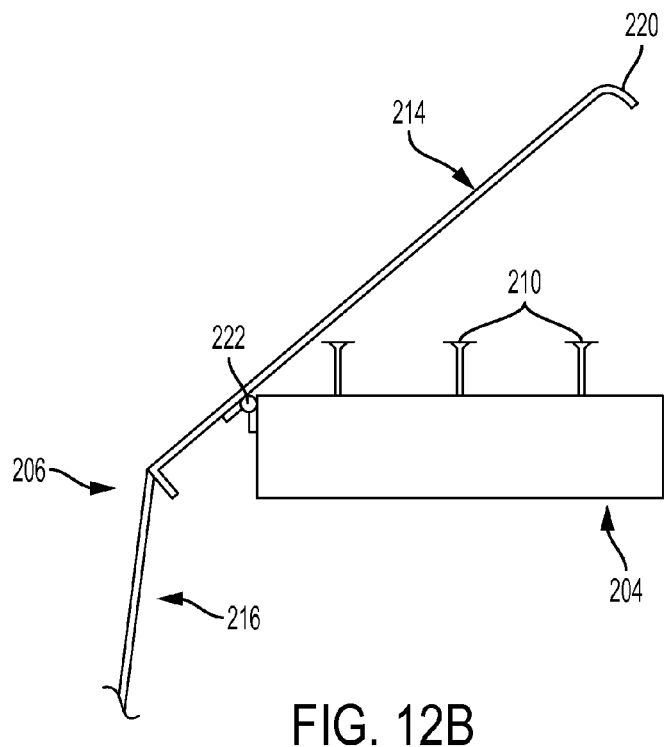
FIG. 12B is the side view of FIG. 12A, with the extraction unit in a generally open position.

With additional reference to FIGS. 9 and 10, the base 204 of the device 200 includes multiple tines 210 (e.g., spikes, etc.) projecting from the base 204 and configured to engage the ground surface, and the vegetation, in use of the device 200. The tines 210 can be coupled to the base 204 by suitable means. For example, in the illustrated embodiment, the tines 210 are threaded into the base 204. In other exemplary embodiments, devices may include bases with tines welded thereto, glued thereto, bolted thereto, formed integral therewith, etc.

In the illustrated embodiment, the tines 210 of the base 204 are arranged in an array having three rows, with each of the tines 210 generally uniformly spaced apart (e.g., about one inch, about two inches, greater than about two inches, between about one and about four inches, other lengths, etc.). A first row (e.g., a row located toward a forward edge of the base 204, etc.) and a third row (e.g., a row located toward a rearward edge of the base 204, etc.) of the tines 210 are arranged generally in line with each other (e.g., the tines 210 of the first row and the tines 210 of the third row are generally vertically aligned, as viewed in FIG. 10, etc.). And, a second row (e.g., a middle row, etc.) of the tines 210 is located generally between the first and third rows. In the second row, the tines 210 are staggered with respect to the placement of the tines 210 in the first and third rows (and generally aligned with a center of the spaces between adjacent tines 210 in the first and third rows). As an example, if the tines 210 in the first and third rows are located at zero inches, two inches, four inches, and six inches, the tines 210 in the second row are then located at one inch, three inches, and five inches. This arrangement of tines 210 may help facilitate grasping, holding, collecting, etc. of the vegetation so that the vegetation can be removed from the ground surface with roots included.

Each of the tines 210 includes a shaft and a generally rounded (e.g., generally circular, generally arcuate, generally oval, etc.) head. In some aspects, the head may also be generally flat (e.g., a portion of the head configured to engage the ground surface may be generally flat, etc.). In the illustrated embodiment, the head is generally circular in shape, and the head of each of the tines 210 has a circumference that is generally greater than a circumference of the shaft. Each of the tines 210 is also coupled to the base 204 by the shaft, with the head then positioned, spaced, etc. a distance from the base 204 (e.g., about two inches, greater than about two inches, less than about two inches, any desired distance, etc.). The generally flat heads of the tines 210 help the tines 210 slip under the vegetation (e.g., under roots of vegetation, under portions of vine based vegetation, under roots of vine based vegetation, under a weed's creeping runners, etc.), and may help facilitate grasping of the vegetation so that the vegetation can be removed from the ground surface with roots included. The generally circular shapes of the tines 210 help allow the user to move the device 200 in a full 360 degree range of sweeping motion across the ground surface during use. Further, the spacing of the heads of the tines 210 from the base 204 helps accommodate the removal of the vegetation from the ground surface and, in some aspects, collection of the vegetation on the base 204.

With additional reference now to FIGS. 11A-12B, the extraction unit 206 of the device 200 generally includes a grate 214, and an actuator 216 coupled to the grate 214. The grate 214 is coupled to the base 204 and is selectively moveable (e.g., pivotable, etc.) by the actuator 216, relative to the base 204, to remove vegetation from the device 200 as needed/desired. For example, the grate 214 can be positioned generally flat against the base 204 in a first, closed position (FIGS. 11A and 12A) during use of the device 200 to allow the tines 210 of the head to engage and remove vegetation from the ground surface. The grate 214 can then be moved, relative to the base 204, to a second, open position (FIGS. 11B and 12B) to remove collected vegetation from the device 200 (e.g., the grate 214 can be moved, advance, etc. past the heads of the tines 210 to thereby remove, dislodge, etc. vegetation from the device 200, etc.). Thus, as can be seen, the grate 214 can be positioned out of the way of the tines 210 during use of the device 200 so that the tines 210 can engage and remove the vegetation from the ground surface, but can then also be moved to a position for removing, dislodging, etc. collected vegetation from the base 204.

The illustrated grate 214 generally includes a frame 218 and multiple longitudinal members 220 supported by the frame 218 and coupled thereto (e.g., welded, etc.). The longitudinal members 220 are spaced apart so that, when the grate 214 is in the first position, generally flat against the base 204, the longitudinal members 220 are disposed generally between the tines 210 (with the heads of the tines 210 extending generally beyond the longitudinal members 220). The grate 214 can then move from the first position to the second position, relative to the tines 210, without interference (e.g., such that the longitudinal members 220 can move beyond the tines 210, and remove vegetation collected by the tines 210 generally above the grate 214, etc.). In addition, the longitudinal members 220 are sized so that, when the grate 214 is in the first position, the spacing between the base 204 and the heads of the tines 210 is generally maintained to thereby allow use of the device 200 to remove vegetation from the ground surface. Further, the frame 218 and longitudinal members 220 may be shaped to help avoid interference with the ground surface during use of the device 200. For example, the longitudinal members 220 may extend generally beyond the base 204 and may be bent, folded, etc. generally upwardly, etc.

In the illustrated embodiment, the grate 214 of the extraction unit 206 is pivotally coupled to a rearward end portion of the base 204 by a hinge 222. As such, the grate 214 can pivot (via the hinge 222) between the first position where the grate 214 is substantially flat against the base 204, and the second position where the grate 214 is at an angle relative to the base 204. In some aspects, the hinge 222 may also include a spring mechanism that biases the grate 214 toward the first position where the grate 214 is generally flat against the base 204. Alternatively, suitable fasteners may be used to help hold the grate 214 in the first position during use of the device 200 (where the fasteners can be disengaged when desired to move the grate 214 to the second position).

Also in the illustrated embodiment, the actuator 216 is pivotally coupled to the grate 214 by a hinge to thereby allow the actuator 216 to move the grate 214 between the first and second positions. In some aspects, the grate 214 may extend beyond a rear end portion of the base 204 of the device 200 and may even further have a bend to allow for a smaller angle of coupling between the actuator 216 and the grate 214. A free end of the actuator 216 is configured to releasably couple to the handle 202 by a structure 226 (e.g., at a detent on the handle 202, at a handle tube, at a stop on the handle 202, etc.), for example, to hold the actuator 216 stationary until use of the extraction unit 206 is needed, to help hold the grate 214 generally flat against the base 204 (in the first position), to help inhibit interference from the actuator 216 during use of the device 200, etc. When desired, the free end of the actuator 216 may then be pulled away from the handle 202 to allow the user to operate the extraction unit 206 and move the grate 214 (e.g., pivot the grate 214 past the tines 210 to remove vegetation from the tines 210 and/or base 204 of the device 200, etc.). Although the extraction unit 206 of the illustrated device 200 has been described as having an actuator for use in moving the grate 214, it should be appreciated that the actuator could be removed from the extraction device and the grate 214 could be manually operated.

Figure 13A:
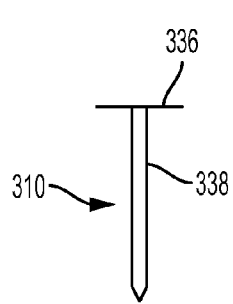
FIGS. 13A-13C are side views of exemplary tines suitable for use in devices of the present disclosure for removing vegetation from ground surfaces.
Figure 13B:
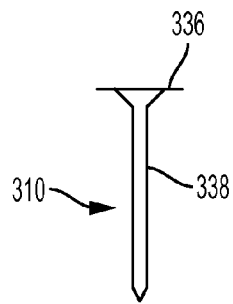
Figure 13C:
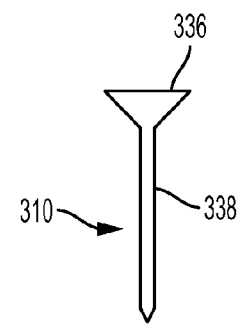

FIGS. 13A-13C illustrate exemplary tines 310 that can be used with devices of the present disclosure (e.g., device 100, device 200, device 600, etc.). However, it should be appreciated that other configurations of tines may be used within the scope of the present disclosure. With that said, the exemplary tines 310 illustrated in FIGS. 13A-13C generally include a head 336 and a shaft 338. In addition, the tines 310 illustrated in FIGS. 13B and 13C generally include a tapered portion adjacent the head 336 (e.g., where the shaft 338 couples to the head 336, etc.). Here, the tapered portion can help facilitate removal of vegetation from the tines 310 (e.g., via an extraction unit, etc.) when desired. In addition, the heads 336 of the tines 310 may have any suitable thickness within the scope of the present disclosure (e.g., without limitation, thicknesses ranging from about 0.03 inches to about 0.13, etc.).

Figure 14:
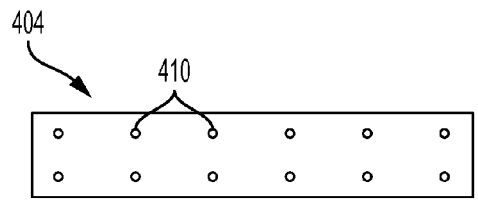
FIGS. 14-16 are top views of exemplary bases suitable for use in devices of the present disclosure for removing vegetation from ground surfaces, and illustrating different arrangements of tines for use in the devices.
Figure 15:
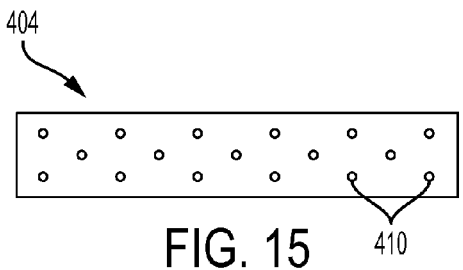
Figure 16:
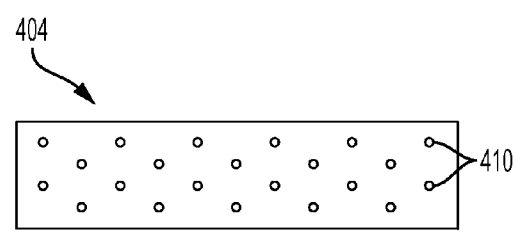

FIGS. 14-16 illustrate multiple different tine patterns for tines 410 in bases 404 that can be used with devices (e.g., device 100, device 200, device 600, etc.) of the present disclosure. As can be seen, the tines 410 may be arranged on the bases 404 in any suitable configuration for removing and/or collecting vegetation. For example, the tines 410 may be arranged in one or more rows each of which may or may not be offset from other row(s) (e.g., two rows of tines 410 which are aligned with one another (FIG. 14), three rows of tines 410 in which the front and rear row are aligned but the middle row is offset (FIG. 15), four rows in which the first and third rows are aligned and the second and fourth rows are aligned but offset from the first and third rows (FIG. 16), etc.). Again, it is understood that other suitable tine patterns may be used without departing from the scope of the present disclosure.

Figure 17:
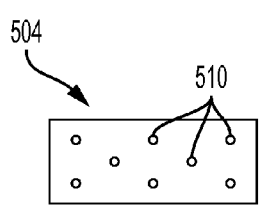
FIGS. 17-19 are top views of exemplary bases suitable for use in devices of the present disclosure for removing vegetation from ground surfaces, and illustrating different configurations of bases and tines for the devices.
Figure 18:
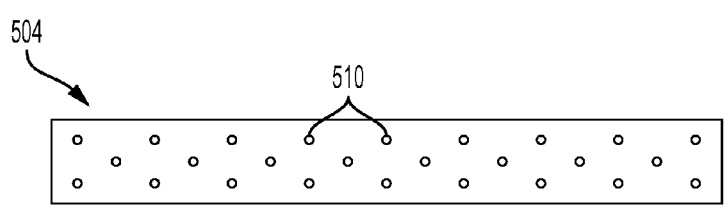
Figure 19:
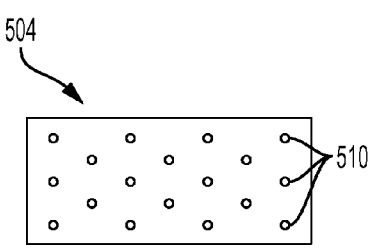

FIGS. 17-19 illustrate multiple different configurations of bases 504 that can be used with devices (e.g., device 100, device 200, device 600, etc.) of the present disclosure. As can be seen, the bases 504 may have any suitable shape for supporting tines 510 for removing and/or collecting vegetation. For example, the bases 504 may have a generally small rectangular shape having three shorter rows of tines 510 (FIG. 17), a generally long and narrow shape having three longer rows of tines 510 (FIG. 18), a generally larger rectangular shape having five rows of tines 510 (FIG. 19), a generally square shape, a generally circular shape, a generally oval shape, other shapes, etc. Again, it is understood that other suitable shapes for bases of devices may be used without departing from the scope of the present disclosure.

Figure 20:
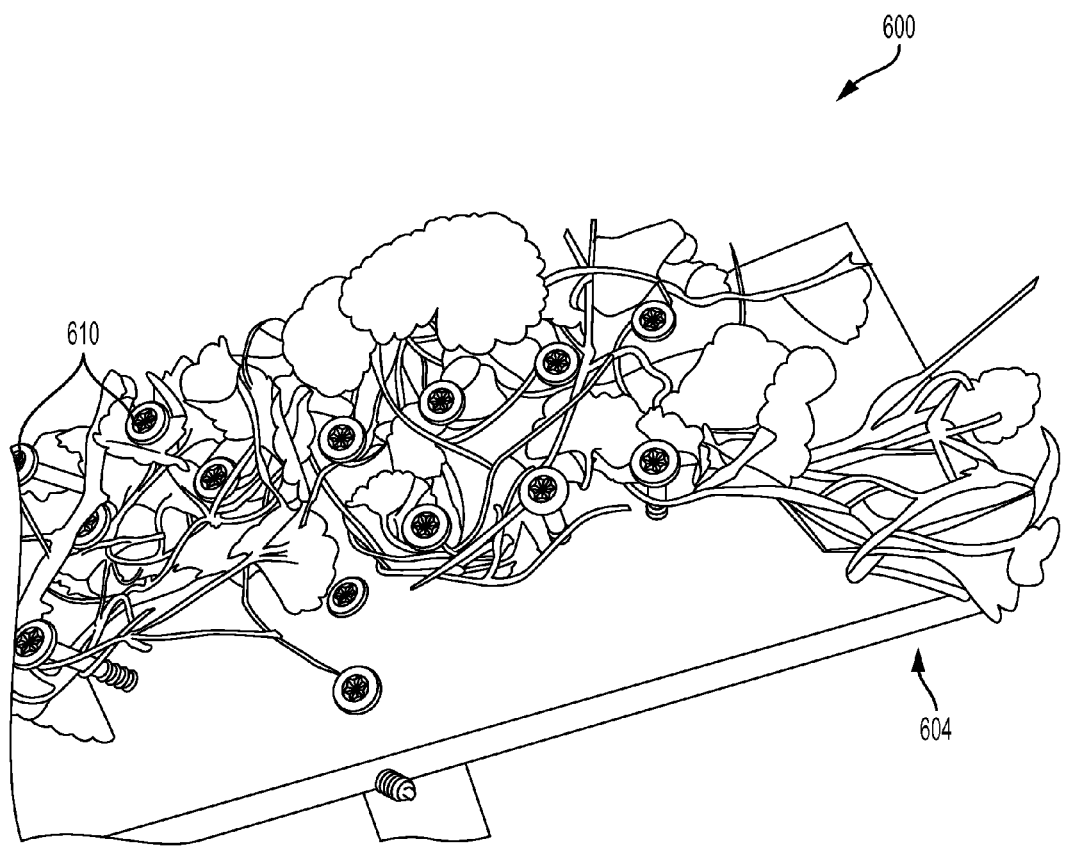
FIG. 20 is a fragmentary perspective view of an exemplary embodiment of a device according to the present disclosure for removing vegetation from ground surfaces, with vegetation shown collected on a base of the device.

FIG. 20 illustrates another exemplary embodiment of a device 600 for removing vegetation from ground surfaces according to the present disclosure. Here, vegetation removed from a ground surface is shown grasped and collected on a base 604 of the device 600, generally between tines 610 of the device 600.

FIGS. 21-23 illustrate an exemplary embodiment of a base 704 that can be used with a device (e.g., device 100, device 200, device 600, etc.) of the present disclosure for removing vegetation from ground surfaces. For example, the base 704 may be used in any of the devices 100, 200, 600, etc. in place of the bases 104, 204, 604, etc.

In this embodiment, the base 704 generally includes side members 740 and 742 and three cross supports 744-748 extending between the side members 740 and 742 (e.g., defining a skeleton configuration, etc.). First and second cross supports 744 and 746 are located toward end portions of the side members 740 and 742, and a third cross support 748 is located generally centrally therebetween. A brace (e.g., similar to brace, etc.) may then be used to couple the base 704 to a handle. In the illustrated embodiment, the side members 740 and 742 and the cross supports 744-748 are constructed from metal. In other embodiments, the side members 740 and 742 and the cross supports 744-748 may be constructed from other material such as, for example, wood, plastic, etc.

Also in the base 704, tines 710 are coupled to each of the cross supports 744-748. In particular, the tines 710 are welded to the cross supports 744-748 (as shown, for example, in FIG. 23), but could be coupled thereto differently in other embodiments. In addition, five tines 710 are coupled to each of the cross supports 744-748. However, it should be appreciated that other numbers of tines 710 and/or arrangements of tines 710 may be used, for example, as described herein.

In various exemplary embodiments, devices of the present disclosure are designed to grasp and collect vegetation on the devices (e.g., on bases of the devices, between tines of the devices, etc.). In other words, such devices are intended to clog during use. In fact, in such embodiments tines of the devices are configured (e.g., arranged on the bases, sized, shaped, etc.) to increase such grasping and collection (and clogging) of the vegetation on the devices, regardless of direction of movement of the devices. In some aspects, such grasping and collection (and clogging) of the vegetation on the devices helps with disposal of the vegetation. In other aspects, such grasping and collection (and clogging) of the vegetation on the devices may deaden the impact of the removal of the vegetation, and may make it more likely that the vegetation will be removed with roots intact (e.g., without first breaking a stalk of the vegetation, etc.) (e.g., make the devices more effective at grasping vegetation, etc.). In still other aspects, such grasping and collection (and clogging) of the vegetation of the devices allows the devices to collect the vegetation on the devices while simultaneously removing it from the ground surfaces (and leaving soil behind). As such, the vegetation is not piled up, but can be directly disposed, discarded, etc. (e.g., into a trash can, etc.).

In contrast, conventional rakes and lawn tools are designed to generally avoid clogging, so that the impact of the strike from pulling is focused on where tines strike the vegetation at the moment of impact. As such, it is more likely that the conventional rakes and lawn tools will break the vegetation above the roots. Further, conventional rakes and lawn tools are typically designed to be pulled across the ground surfaces for use. They are not operable in a 360 degree range of movements.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Or for example, the term "about" as used herein when modifying a quantity of an ingredient or reactant of the invention or employed refers to variation in the numerical quantity that can happen through typical measuring and handling procedures used, for example, when making concentrates or solutions in the real world through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A device for removing vegetation from ground surfaces, the device comprising:
   a base;
   multiple tines coupled to the base and extending therefrom, each of the tines having a shaft and a generally rounded head, and wherein, for each of the tines, a circumference of the head is greater than a circumference of the shaft and a portion of the head configured to engage the ground surface is generally flat, the flat portion of the head being substantially perpendicular to a longitudinal axis of the shaft; and
   a handle coupled to the base for moving the base relative to a ground surface for removing vegetation from the ground surface by moving the heads of the tines under the vegetation to facilitate grasping of the vegetation by the tines.

2. The device of claim 1, further comprising an extraction unit coupled to the base of the device for removing collected vegetation from the device.

3. The device of claim 2, wherein the extraction unit includes a grate having multiple longitudinal members, the longitudinal members disposed generally between tines of the device when the extraction unit is positioned generally flush against the base of the device.

4. The device of claim 3, wherein the extraction unit is operable to move the longitudinal members relative to the tines to thereby remove the collected vegetation from the device.

5. The device of claim 4, wherein the extraction unit includes an actuator coupled to the grate for moving the longitudinal members of the grate relative to the tines.

6. The device of claim 3, wherein the grate of the extraction unit is pivotally coupled to the base of the device.

7. The device of claim 1, wherein the handle is coupled to the base at an angle of about forty degrees or less relative to the base.

8. The device of claim 1, wherein the tines are arranged in an array comprising at least two offset rows.

9. The device of claim 8, wherein each of the tines is spaced apart from an adjacent tine by a distance of between about one inch and about four inches.

10. The device of claim 1, wherein each of the tines includes a tapered portion adjacent the head.

11. A device for removing vegetation from ground surfaces, the device comprising:
    a base having a bottom surface;
    multiple tines extending from the bottom surface of the base, the tines arranged in an array comprising at least two rows, each of the tines including a shaft and a head, the head having a greater circumference than the shaft, and the head being substantially parallel to the bottom surface of the base and spaced from the bottom surface of the base by a fixed distance;
    a handle coupled to the base for moving the base relative to a ground surface for removing vegetation from the ground surface by collecting the vegetation between the bottom surface of the base and the heads of adjacent tines; and
    an extraction unit pivotally coupled to the base for removing collected vegetation from the device, the extraction unit including a hinge attached to a rearward end portion of the base adjacent the bottom surface of the base.

12. The device of claim 11, wherein at least one of the at least two rows of the array of tines is offset from at least another one of the at least two rows.

13. The device of claim 11, wherein, for each of the tines, the head is generally flat and circular, to thereby allow the device to remove the vegetation when operated in a plurality of directions and to improve grasping of the vegetation such that the vegetation may be removed from the ground surface with roots included.

14. The device of claim 11, wherein the extraction unit includes a grate having multiple longitudinal members, the longitudinal members disposed generally between tines of the device when the extraction unit is positioned generally flush against the base of the device.

15. The device of claim 14, wherein the extraction unit is operable to move the longitudinal members relative to the tines to thereby remove the collected vegetation from the device.

16. The device of claim 15, wherein the extraction unit includes an actuator coupled to the grate for moving the longitudinal members of the grate relative to the tines.

17. The device of claim 14, wherein the grate of the extraction unit is pivotally coupled to the base of the device by the hinge.

18. The device of claim 11, wherein the handle is coupled to the base at an angle of about forty degrees or less relative to the base.

19. The device of claim 11, wherein each of the tines is spaced apart from an adjacent tine by a distance of between about one inch and about four inches.

20. A device for removing vegetation from ground surfaces, the device comprising:
  a base;
  multiple tines coupled to the base and extending therefrom, each of the tines having a shaft and a generally flat head configured to engage a ground surface during use of the device to remove vegetation from the ground surface, and wherein, for each of the tines, the flat head defines a ledge extending generally away from the shaft in a substantially 360 degree range around the shaft, to thereby facilitate grasping and lifting of the vegetation from the ground surface by the tine; and
  a handle coupled to the base for moving the base relative to the ground surface to facilitate contact of the tines with the vegetation, whereby the ledge of each of the tines is adapted to move under the vegetation when the base is moved in generally any direction of a substantially 360 degree range of sweeping motion across the ground surface.

\* \* \* \* \*